United States Patent Office 2,830,986
Patented Apr. 15, 1958

2,830,986

GENTROGENIN AND CORRELLOGENIN

Henry A. Walens and Samuel Serota, Philadelphia, and Monroe E. Wall, Oreland, Pa., assignors to the United States of America as represented by the Secretary of Agriculture No Drawing. Application February 20, 1956
Serial No. 566,737

6 Claims. (Cl. 260—239.55)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of United States of America.

This invention relates to new steroidal sapogenins, namely, gentrogenin and correllogenin, which are readily convertible by known processes to sex hormones, cortisone, and related products.

We have discovered that a saponin or saponins found in certain plant tissues, particularly tubers of *Dioscorea spiculiflora*, can be cleaved to yield steroidal sapogenin fragments which we have designated as gentrogenin and correllogenin, and which have the following respective structures:

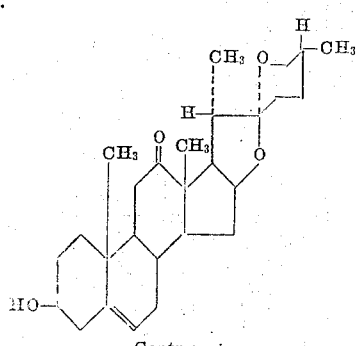

Gentrogenin and

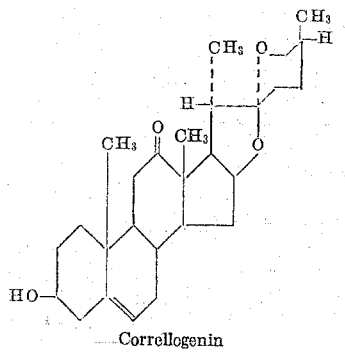

Correllogenin

Gentrogenin is a steroidal sapogenin having M. P. 215–216° C. and $[a]_D^{25}$ (in chloroform), $-57°$; and yielding upon acetylation an acetate having M. P. 227° and $[a]_D^{25}$, $-56°$. Its infrared spectrum shows a strong carbonyl peak at 1712 cm.$^{-1}$, a weak band at 836 cm.$^{-1}$ associated with a 5-ethylenic band, and the typical "22a"=25D fingerprint spectrum 980 (s), 919 (w), 898 (s), 863 (w) cm.$^{-1}$.

Conventional catalytic reduction of gentrogenin acetate followed by oxidation with $CrO_3$-acetic acid readily yields hecogenin acetate. Wolf-Kishner reduction yields diosgenin which can be converted to 16-dehydropregnenolone, progesterone and cortisone by known procedures (cf. Marker et al., J. Am. Chem. Soc., 69, 2117 (1947)).

Correllogenin is a steroidal sapogenin having M. P. 209–211° C. and $[a]_D^{25}$, $-69°$. Acetylation yields the acetate, M. P. 213–214°; $[a]_D^{25}$, $-60°$. The infrared spectrum of the acetate shows two strong bands at 1737 and 1713 cm.$^{-1}$ (acetate and 12-carbonyl, respectively), a weak band at 838 cm.$^{-1}$ and typical 25L bands at 986 (s), 920 (s), 897 (w) and 852 (w) cm.$^{-1}$. Wolf-Kishner reduction of correllogenin yielded yamogenin which in turn was readily converted to progesterone through the intermediate 16-dehydropregnenolone by the method of Marker et al., J. Am. Chem. Soc., 69, 2167 (1947).

According to the invention, tubers of *Dioscorea spiculiflora* are extracted with isopropyl alcohol to dissolve the saponins contained therein and the saponins thereafter boiled with aqueous acid to hydrolyze the saponins to form sapogenins. The sapogenins are treated with acetic anhydride to form a mixture containing ketonic and non-ketonic sapogenin acetates which are then treated with Girard reagent T to separate the sapogenin acetates into ketonic and non-ketonic fractions, the latter being removed. The remaining ketonic sapogenin acetates are dissolved in hot ethyl acetate to form a solution containing both gentrogenin and correllogenin acetates. The solution is allowed to cool causing gentrogenin acetate to separate from the solution as crystals which are isolated therefrom, while the correllogenin acetate remains in solution. Thereafter, gentrogenin is recovered from the gentrogenin acetate crystals and correllogenin is recovered from the correllogenin acetate in the solution.

The following example is illustrative of a convenient method of preparing gentrogenin and correllogenin.

Twenty kilograms of tubers of *Dioscorea spiculiflora* were extracted with isopropyl alcohol. The resultant saponin solution was purified and acid hydrolyzed to a crude sapogenin preparation by boiling with aqueous acid according to the method of Wall et al., J. Biol. Chem., 198, 533 (1952). The crude sapogenins were acetylated with acetic anhydride to form a mixture of ketonic and non-ketonic sapogenin acetates which was treated with Girard reagent T thus separating the sapogenin acetates into ketonic and non-ketonic fractions, the latter being removed. The ketonic fractions, weighing 45.0 g., were dissolved in hot ethyl acetate to form a solution containing both gentrogenin and correllogenin acetates. The solution was then allowed to cool causing gentrogenin acetate to separate from the solution as crystals while the correllogenin acetate remained in solution. The crystals of gentrogenin acetate were isolated in a yield of 40.0 g. and gentrogenin was recovered therefrom. Correllogenin was recovered from the correllogenin acetate in the solution in a high yield of 5.0 g.

Gentrogenin can be readily converted into diosgenin according to the following convenient procedure:

Gentrogenin, 0.3 g., was refluxed with a mixture of 6 ml. diethylene glycol, 6 ml. ethyl alcohol, 0.6 g. sodium hydroxide and 3 ml. hydrazine hydrate for one-half hour under a condenser. The condenser was removed, volatiles boiled off, more diethylene glycol added, and heating continued for two hours at 200°. Ethereal extraction yielded 0.24 g. of diosgenin.

Correllogenin can be readily converted into yamogenin according to the following convenient procedure:

Correllogenin 0.1 g. was refluxed with a mixture of 2 ml. diethylene glycol, 2 ml. ethyl alcohol, 0.2 g. sodium hydroxide and 1 ml. hydrazine hydrate for one-half hour under a condenser. The condenser was removed, volatiles boiled off, more diethylene glycol added, and heating continued for two hours at 200°. Ethereal extraction yielded 0.08 g. yamogenin.

What is claimed is:

1. A steroidal sapogenin selected from the group consisting of the compound gentrogenin having the formula

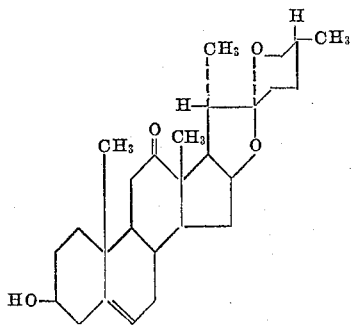

melting at 215°–216° C., $[a]_D^{25} -57°$ (CHCl$_3$), the acetate thereof melting at 227° C., $[a]_D^{25} -56°$ (CHCl$_3$), and the infrared spectrum thereof in carbon disulfide showing absorption at 1712 (s), 980 (s), 919 (w), 898 (s), 863 (w), and 836 (w) cm.$^{-1}$ where (s) and (w) signify strong and weak absorption bands, and the compound correllogenin having the formula

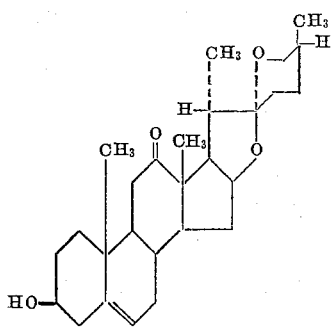

melting at 209°–211° C., $[a]_D^{25} -69°$ (CHCl$_3$), the acetate thereof melting at 213°–214° C., $[a]_D^{25} -60°$ (CHCl$_3$), and the infrared spectrum thereof in carbon disulfide showing absorption at 1713 (s), 986 (s), 920 (s), 897 (w), and 852 (w) cm.$^{-1}$ where (s) and (w) signify strong and weak absorption bands.

2. The compound gentrogenin having the formula

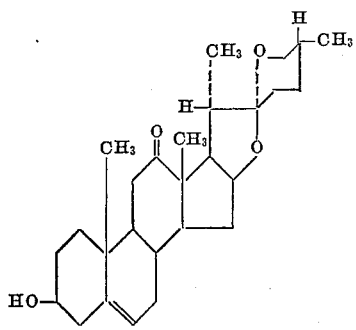

melting at 215°–216° C., $[a]_D^{25} -57°$ (CHCl$_3$), the acetate thereof melting at 227° C., $[a]_D^{25} -56°$ (CHCl$_3$), and the infrared spectrum thereof in carbon disulfide showing absorption at 1712 (s), 980 (s), 919 (w), 898 (s), 863 (w), and 836 (w) cm.$^{-1}$ where (s) and (w) signify strong and weak absorption bands.

3. The compound correllogenin having the formula

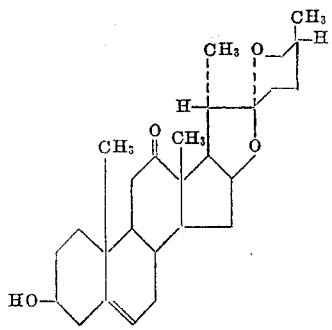

melting at 209°–211° C., $[a]_D^{25} -69°$ (CHCl$_3$), the acetate thereof melting at 213°–214° C., $[a]_D^{25} -60°$ (CHCl$_3$), and the infrared spectrum thereof in carbon disulfide showing absorption at 1713 (s), 986 (s), 920 (s), 897 (w), and 852 (w) cm.$^{-1}$ where (s) and (w) signify strong and weak absorption bands.

4. A process of obtaining the compounds gentrogenin and correllogenin from tubers of *Dioscorea spiculiflora* comprising extracting the tubers of *Dioscorea spiculiflora* with isopropyl alcohol to dissolve the saponins contained therein, boiling the saponins with aqueous acid to hydrolyze the saponins to form sapogenins, treating the sapogenins with acetic anhydride to form a mixture containing ketonic and non-ketonic sapogen acetates, treating the mixture containing the sapogenin acetates with Girard reagent T to separate the sapogenin acetates into ketonic and non-ketonic fractions, the latter being removed, dissolving the remaining ketonic sapogenin acetates in hot ethyl acetate to obtain a solution containing both gentrogenin acetate and correllogenin acetate, cooling this solution containing gentrogenin and correllogenin acetates to cause gentrogenin acetate to separate as crystals from the solution while the correllogenin acetate remains in solution, isolating the gentrogenin acetate crystals and recovering gentrogenin therefrom, and isolating the correllogenin acetate from the solution and recovering correllogenin therefrom, the compound gentrogenin having the formula

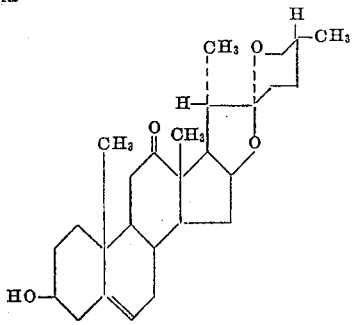

melting at 215°–216° C., $[a]_D^{25} -57°$ (CHCl$_3$), the acetate thereof melting at 227° C., $[a]_D^{25} -56°$ (CHCl$_3$), and the infrared spectrum thereof in carbon disulfide showing absorption at 1712 (s), 980 (s), 919 (w), 898 (s), 863 (w), and 836 (w) cm.$^{-1}$ where (s) and (w) signify strong and weak absorption bands, and the compound correllogenin having the formula

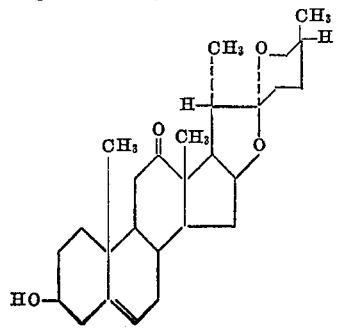

melting at 209°–211° C., $[a]_D^{25}$ —69° (CHCl₃), the acetate thereof melting at 213°–214° C., $[a]_D^{25}$ —60° (CHCl₃), and the infrared spectrum thereof in carbon disulfide showing absorption at 1713 (s), 986 (s), 920 (s), 897 (w), and 852 (w) cm.⁻¹ where (s) and (w) signify strong and weak absorption bands.

5. A process of obtaining the compound gentrogenin from tubers of *Dioscorea spiculiflora* comprising extracting the tubers of *Dioscorea spiculiflora* with isopropyl alcohol to dissolve the saponins contained therein, boiling the saponins with aqueous acid to hydrolyze the saponins to form sapogenins, treating the sapogenins with acetic anhydride to form a mixture containing ketonic and non-ketonic sapogenin acetates, treating the mixture containing the sapogenin acetates with Girard reagent T to separate the sapogenin acetates into ketonic and non-ketonic fractions, the latter being removed, dissolving the remaining ketonic sapogenin acetates in hot ethyl acetate to obtain a solution containing gentrogenin acetate, cooling this solution to cause the gentrogenin acetate to separate as crystals from the solution, isolating the gentrogenin acetate crystals, and recovering gentrogenin therefrom, the compound gentrogenin having the formula

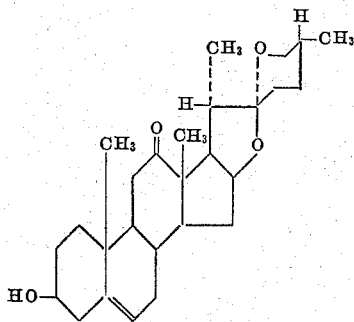

melting at 215°–216° C., $[a]_D^{25}$ —57° (CHCl₃), the acetate thereof melting at 227° C., $[a]_D^{25}$ —56° (CHCl₃), and the infrared spectrum thereof in carbon disulfide showing absorption at 1712 (s), 980 (s), 919 (w), 898 (s), 863 (w), and 836 (w), cm.⁻¹ where (s) and (w) signify strong and weak absorption bands.

6. A process of obtaining the compound correllogenin from tubers of *Dioscorea spiculiflora* comprising extracting the tubers of *Dioscorea spiculiflora* with isopropyl alcohol to dissolve the saponins contained therein, boiling the saponins with aqueous acid to hydrolyze the saponins to form sapogenins, treating the sapogenins with acetic anhydride to form a mixture containing ketonic and non-ketonic sapogenin acetates, treating the mixture containing the sapogenin acetates with Girard reagent T to separate the sapogenin acetates into ketonic and non-ketonic fractions, the latter being removed, dissolving the remaining ketonic sapogenin acetates in hot ethyl acetate to obtain a solution containing correllogenin acetate and other compounds, cooling this solution to cause these other compounds to crystallize out of solution while the correllogenin acetate remains in solution, isolating the correllogenin acetate from the solution and recovering correllogenin therefrom, the compound correllogenin having the formula

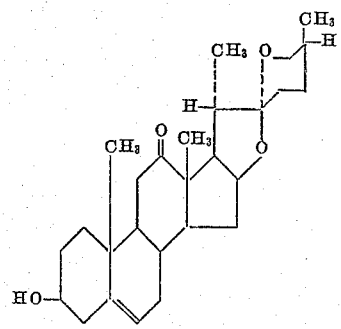

melting at 209°–211° C., $[a]_D^{25}$ —69° (CHCl₃), the acetate thereof melting at 213°–214° C., $[a]_D^{25}$ —60° (CHCl₃), and the infrared spectrum thereof in carbon disulfide showing absorption at 1713 (s), 986 (s), 920 (s), 897 (w), and 852 (w) cm.⁻¹ where (s) and (w) signify strong and weak absorption bands.

References Cited in the file of this patent

UNITED STATES PATENTS 2,408,835     Wagner _____ May 15, 1944

OTHER REFERENCES

Marker: J. Am. Chem. Soc., vol 71, p. 2656 (1949).
Marker et al.: J. Am. Chem. Soc., vol 69, pp 2397–2398 (1947).
Wall et al.: Steroidal Sapogenins, XIII, Supplementary Table of data for Steroidal Sapogenins, VII (February, 1954).
Wall et al.: J. Am. Chem. Soc., vol. 77, p. 5196 (1955).